United States Patent
Kimura et al.

(10) Patent No.: US 10,315,941 B2
(45) Date of Patent: Jun. 11, 2019

(54) METHOD FOR TREATING AMMONIACAL NITROGEN IN WASTEWATER

(71) Applicant: Hitachi, Ltd., Tokyo (JP)

(72) Inventors: Yuya Kimura, Tokyo (JP); Shinichi Yoshikawa, Tokyo (JP); Shoko Miyamae, Tokyo (JP); Hajime Ikuta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 15/478,456

(22) Filed: Apr. 4, 2017

(65) Prior Publication Data

US 2018/0208491 A1    Jul. 26, 2018

(30) Foreign Application Priority Data

Jan. 25, 2017   (JP) ................................ 2017-011598

(51) Int. Cl.
| | |
|---|---|
| *C02F 3/30* | (2006.01) |
| *C02F 3/00* | (2006.01) |
| *C02F 101/16* | (2006.01) |
| *C02F 103/20* | (2006.01) |
| *C02F 103/34* | (2006.01) |

(52) U.S. Cl.
CPC .............. *C02F 3/303* (2013.01); *C02F 3/006* (2013.01); *C02F 3/307* (2013.01); *C02F 2101/16* (2013.01); *C02F 2103/20* (2013.01); *C02F 2103/343* (2013.01); *C02F 2103/346* (2013.01)

(58) Field of Classification Search
CPC ...... C02F 3/006; C02F 3/303; C02F 2101/16; C02F 2103/20; C02F 2103/343; C02F 2103/346
See application file for complete search history.

(56) References Cited

FOREIGN PATENT DOCUMENTS

| JP | 5292659 B2 | 1/2003 |
|---|---|---|
| JP | 3788601 B2 | 7/2003 |
| JP | 2005131452 A | 5/2005 |

OTHER PUBLICATIONS

Ge, et al., "Detection of nitrifiers and evaluation of partial nitrification for wastewater treatment: A review," Chemosphere, 140:85-98, . (Year: 2015).*

(Continued)

*Primary Examiner* — Patrick J Orme

(57) ABSTRACT

Provided is a method for treating ammoniacal nitrogen in wastewater performed via biologically oxidizing ammoniacal nitrogen, and producing nitrite nitrogen and nitrate nitrogen at a desired rate. In the method, ammoniacal nitrogen is oxidized by bacterial sludges to produce at least either of nitrite nitrogen and nitrate nitrogen. Specifically, the method includes an inactivating treatment step of treating the bacterial sludges with an inactivating operation via sterilizing bacteria or causing bacteriostasis, and a nitrifying treatment step of oxidizing the ammoniacal nitrogen by the bacterial sludges thus treated in the inactivating operation. Production amounts of the nitrite nitrogen and the nitrate nitrogen are controlled by adjusting biomass of the bacterial sludges to be treated in the inactivating operation, and/or a time interval between the inactivating operations each repeatedly performed in combination with the nitrifying treatment step.

6 Claims, 1 Drawing Sheet

(56) References Cited

OTHER PUBLICATIONS

Extended European Search Report for European Patent Application No. 17164211.9, dated Oct. 18, 2017, 9 pages.

Shijian, G., et al., "Detection of nitrifiers and evaluation of partial nitrification for wastewater treatment: A review", Chemosphere, Pergamon Press, Oxford, Great Britain, vol. 140, Mar. 18, 2015, pp. 85-98.

Yeshi, C., et al., "Mainstream partial nitritation—anammox in municipal wastewater treatment: status, bottlenecks, and further studies", Applied Microbiology and Biotechnology, Springer-Verlag Berlin Heidelberg, Germany, vol. 101, No. 4, Jan. 13, 2017, pp. 1365-1383.

Isaka, K., et al., "Novel autotrophic nitrogen removal system using gel entrapment technology", Bioresource Technology 102 (2011), pp. 7720-7726.

\* cited by examiner

METHOD FOR TREATING AMMONIACAL NITROGEN IN WASTEWATER

CROSS-REFERENCE TO RELATED APPLICATION

This application claims the benefit of and priority to previously filed Japanese Patent Application No. 2017-011598 filed on Jan. 25, 2017, which is hereby incorporated by reference in its entirety.

BACKGROUND OF THE INVENTION

1. Field of the Invention

The present invention relates to a method for treating ammoniacal nitrogen in wastewater, and particularly relates to a method for nitrifying ammoniacal nitrogen contained in wastewater via biological oxidation and producing nitrite nitrogen and nitrate nitrogen at a desired rate.

2. Description of the Related Art

Wastewater containing nitrogenous components is a key factor in promoting eutrophication in closed water areas to cause water pollution. Hence, a nitrifying treatment is carried out by biologically decomposing and removing nitrogenous components in wastewater via using bacteria in some sewage treating facilities and wastewater treating facilities.

Conventionally, a nitrifying-denitrifying treatment performed by combination of nitrifying and denitrifying treatments has been widely used as a method for biologically treating wastewater containing nitrogenous components. In the nitrifying-denitrifying treatment, ammoniacal nitrogen contained in to-be-treated water is oxidized up to nitrate nitrogen by a nitrifying bacterial population, subsequently the resultant nitrate nitrogen is reduced to nitrogen gas by denitrifying bacteria, whereby nitrogenous components are eventually removed.

On the other hand, the anaerobic ammonium oxidation (ANAMMOX) method has been recently developed to be practically usable. The anaerobic ammonium oxidation reaction is a reaction in which ammonia and nitrite are co-denitrified under the anaerobic conditions, and represented by the following chemical formula (1).

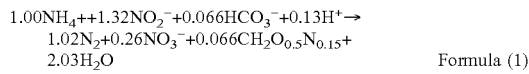

$$1.00NH_4^+ + 1.32NO_2^- + 0.066HCO_3^- + 0.13H^+ \rightarrow 1.02N_2 + 0.26NO_3^- + 0.066CH_2O_{0.5}N_{0.15} + 2.03H_2O \quad \text{Formula (1)}$$

The anaerobic ammonium oxidation reaction is performed by autotrophy anaerobic ammonium oxidizing bacteria using ammonia as a hydrogen donor. This reaction has advantages that feeding of a carbon source such as methanol is not needed thereto, resulting in suppression of the operation cost in a low level. Further, it is not needed to oxidize nitrite nitrogen to nitrate nitrogen, which reduces the power cost required for aeration. Moreover, the anaerobic ammonium oxidizing bacteria have a high denitrifying rate, while having a low growth yield. This feature contributes to maintenance of the process efficiency, and reduction of the equipment scale, leading to an advantage for reducing the excess sludges.

Wastewater containing nitrogenous components generally includes ammoniacal nitrogen in many cases. On the other hand, in the anaerobic ammonium oxidation reaction, ammonium reacts with nitrite at the rate of approximately 1:1.3 as represented by Formula (1). Therefore, in the anaerobic ammonium oxidation method, nitrite type nitrification is performed so that a part of ammoniacal nitrogen is oxidized to nitrite nitrogen.

A method for treating ammoniacal nitrogen by the anaerobic ammonium oxidation method is categorized in two techniques. One is a single-tank technique which uses a single-tank configured to carry out nitrite nitrification and anaerobic ammonium oxidation. The other is a two-tank technique which uses an ammonium oxidizing tank configured to carry out the nitrite nitrification and an anaerobic ammonium oxidation reaction tank configured to carry out the anaerobic ammonium oxidation.

The single-tank technique includes a CANON method carried out under the aeration conditions in which the oxygen concentration is restricted at a low level, an OLAND method carried out under the conditions in which the oxygen concentration is restricted at a low level, and an SNAP method carried out by growing the anaerobic ammonium oxidizing bacteria inside a carrier which sticks and fixes a nitrifying bacterial population therein.

Further, the two-tank technique includes a one-pass method for introducing all amounts of to-be-treated water into the ammonium oxidizing tank so as to partially nitrite-oxidize a part of ammoniacal nitrogen to nitrite nitrogen, and a by-pass method for introducing a part of to-be-treated water into an ammonium oxidizing tank so as to nitrate-oxidize all of the ammoniacal nitrogen to nitrate nitrogen, while diverting the remained part of the to-be-treated water to be joined to the treated water.

Generally, a bacterial sludge containing a nitrifying bacteria population is used for the nitrite nitrification which oxidizes ammoniacal nitrogen to nitrate nitrogen. The nitrifying bacteria are typically a mixture of ammonium oxidizing bacteria (AOB) which oxidize ammoniacal nitrogen to nitrite nitrogen and nitrate oxidizing bacterial (NOB) which oxidize nitrite nitrogen to nitrate nitrogen.

Hence, both the methods for treating ammoniacal nitrogen are demanded to control progress of the nitrite nitrification, so that the oxidation of ammoniacal nitrogen comes to stop to nitrite nitrogen, and the operation is carried out by keeping the production amount and rate of the nitrite nitrogen.

Generally, it is well known that operation of the nitrite nitrification using a nitrifying bacteria population is not easily continued while stably keeping the production amount of nitrate nitrogen. In a typical water quality, nitrite oxidizing bacteria tend to grow and proliferate. Thus, in many cases, nitrite nitrogen produced by the ammonium oxidizing bacteria is rapidly oxidized to nitrate nitrogen, and therefore, it is difficult to control the oxidation of the ammoniacal nitrogen within the partial oxidation stopping to the nitrite nitrogen. Hence, various methods have been investigated to control the production amount of nitrate nitrogen.

For example, Japanese Patent Publication No. 5292659 discloses a nitrifying method performed by adjusting an aeration flow rate of a nitrifying tank thereby to control the nitrification to be nitrite-type nitrification.

Further, Japanese Unexamined Patent Application Publication No. 2005-131452 discloses a nitrifying method for treating wastewater containing ammoniacal nitrogen. In this method, a nitrifying tank is divided to two tanks of first and second nitrifying tanks, and the nitrifying conditions of the first nitrifying tank are controlled so that to-be-treated water in the first nitrifying tank has a free ammonium concentration higher than the inhibitory concentration to inhibit the bioactivity of nitrite oxidizing bacteria.

Moreover, Japanese Patent Publication No. 3788601 discloses a method for manufacturing a nitrite-type nitrifying carrier which preferentially accumulates ammonium oxidizing bacteria. For example, it is described that a method is performed by inclusively-immobilizing a sludge with a monomer or a prepolymer used for immobilizing ammonium oxidizing bacteria, and subsequently heating the resultant material at the temperature ranging from 60° C. to 80° C. for the polymerization. Further, it is described that another method is performed by heating a monomer or a prepolymer used for immobilizing bacteria in the presence of the sludge for at least one hour for the polymerization.

A method for controlling a production amount of nitrite nitrogen within a target one includes a technique performed by measuring a total nitrogen concentration or an ammoniacal nitrogen concentration as disclosed in ISAKA, K. et al. "Novel autotrophic nitrogen removal system using gel entrapment technology", Bioresource Technology, 2011, 102, pp. 7720-7726, and adjusting a dissolved oxygen concentration via referring to a nitrite oxidizing rate ($\eta Nit$) as a standard value calculated by the total nitrogen concentration or the ammoniacal nitrogen concentration thus measured.

For example, ISAKA et al., discloses that a total nitrogen concentration or an ammoniacal nitrogen concentration is measured in a sensing tank provided at a downstream side of a nitrite-oxidizing tank.

As disclosed in Japanese Patent Publication No. 5292659 and Japanese Unexamined Patent Application Publication No. 2005-131452, there is a technique for controlling a production amount of nitrite nitrogen via adjusting a dissolved oxygen concentration and an ammoniacal nitrogen concentration in a nitrifying tank. However, a method for controlling simply an aeration flow rate alone as disclosed in Japanese Patent Publication No. 5292659 and a method for controlling simply a free ammonium concentration alone as disclosed in Japanese Unexamined Patent Application Publication No. 2005-131452 have a disadvantage so that the responsiveness and accuracy of the control are poor.

For example, when a dissolved oxygen concentration becomes high or a free ammonium concentration becomes low even in a temporary or local way, this change in concentration allows nitrite nitrogen once produced to be oxidized in turn. Accordingly, nitrate nitrogen is extremely accumulated in a typical retention period, letting the production amount of nitrite nitrogen hardly kept within the target one.

Further, biological oxidation of ammoniacal nitrogen contained in wastewater is demanded to be performed so that production amounts of not only nitrite nitrogen but also nitrate nitrogen are controlled within the target amounts. For example, a combining use of heterotrophic bacteria which reduce nitrate nitrogen to nitrite nitrogen and anaerobic ammonium oxidizing bacteria is demanded to produce a stable amount of nitrate nitrogen. However, it is hard to actively control a production amount of nitrate nitrogen by the methods disclosed in the above three patent documents. Further, the method for controlling a dissolved oxygen concentration as disclosed in ISAKA et al. requires a high level of technology and numerous sensors, failing to be a method suitable for the practical use.

SUMMARY OF THE INVENTION

In view of the above disadvantages, an object of the present invention is to provide a method for treating ammoniacal nitrogen in wastewater, performed by biologically oxidizing ammoniacal nitrogen, and producing nitrite nitrogen and nitrate nitrogen at a desired rate.

A method for treating ammoniacal nitrogen in wastewater of the present invention directed toward solving the above disadvantages is carried out so that ammoniacal nitrogen contained in wastewater is oxidized by a bacterial population, thereby to produce at least either of nitrite nitrogen and nitrate nitrogen. More specifically, the method includes the inactivating step of treating the bacterial population with an inactivating operation via sterilization or bacteriostasis, and the nitrifying treatment step of oxidizing the ammoniacal nitrogen by the bacterial population thus treated in the inactivating operation.

Herein, production amounts of the nitrite nitrogen and the nitrate nitrogen are controlled by adjusting biomass of the bacterial population to be inactivated or a time interval between the inactivating operations each repeatedly performed in combination with the nitrifying treatment step.

According to the present invention, a method for treating ammoniacal nitrogen in wastewater may be provided, which is capable of producing nitrite nitrogen and nitrate nitrogen at a desired rate via biological oxidation of the ammoniacal nitrogen.

DETAILED DESCRIPTION OF THE INVENTION

Hereinafter, a method for treating ammoniacal nitrogen in wastewater in an embodiment of the present invention will be described in detail referring to an ammoniacal nitrogen treating device configured to nitrify the ammoniacal nitrogen.

Figure 1:
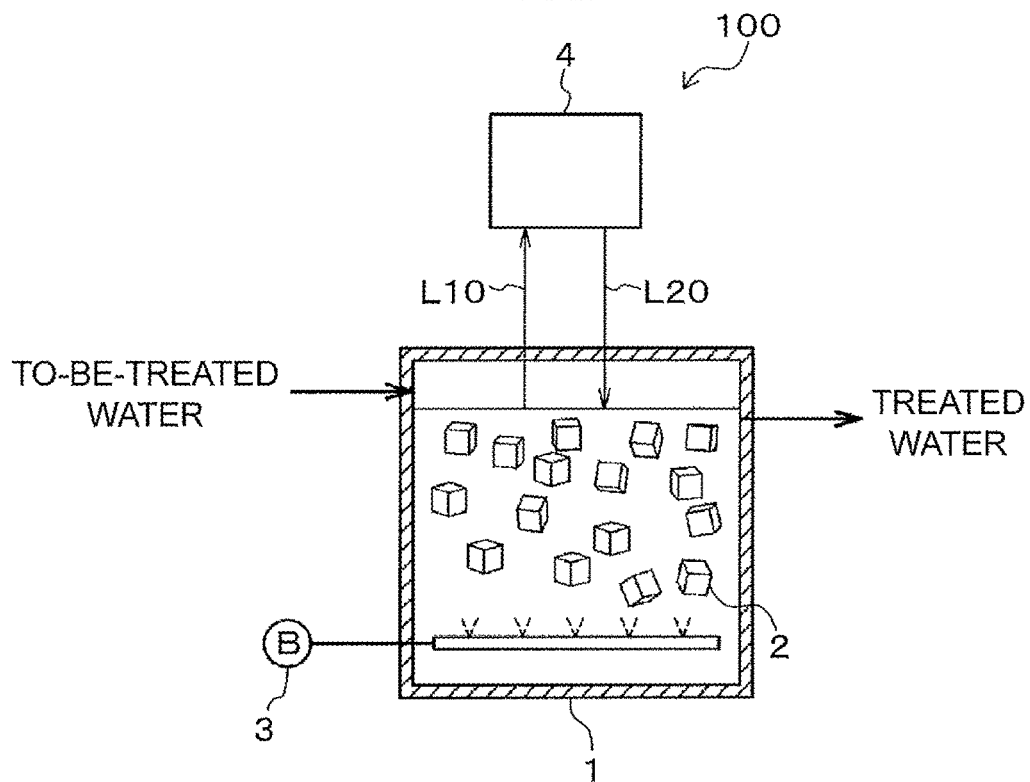
FIG. 1 is a schematic view showing a structure of a wastewater treatment device in an embodiment of the present invention.

FIG. 1 is a schematic view showing a structure of a wastewater treatment device in an embodiment of the present invention.

As shown in FIG. 1, an ammoniacal nitrogen treating device 100 is provided with an ammonium oxidizing tank 1, bacterial sludges 2, an air diffuser 3 and an inactivation treating tank 4. The ammoniacal nitrogen treating device 100 is arranged in, for example, a wastewater treatment system that treats wastewater. Wastewater containing nitrogenous components (i.e., to-be-treated water) is introduced to the ammoniacal nitrogen treating device 100, and a nitrifying treatment is performed via oxidation of the ammoniacal nitrogen contained in the wastewater.

Wastewater containing nitrogenous components (i.e., to-be-treated water) includes, for example, wastewater discharged from factories such as a sewage treatment facility, a semiconductor plant, a metal refinery, a pharmaceutical manufacturing facility, and a stockbreeding facility. The wastewater may contain nutrient salts of phosphorus, carbon, and heavy metals or the like in addition to ammoniacal nitrogen. An ammoniacal nitrogen concentration in wastewater is not particularly limited to a specific one. However, the concentration is preferably in the range from 1 to 1000 mg/L, more preferably from 20 to 100 mg/L.

The ammonium oxidizing tank 1 is a treating tank configured to treat wastewater (i.e., to-be-treated water) through a nitrifying process. In the ammonium oxidizing tank 1, ammoniacal nitrogen contained in wastewater is biologically oxidized by bacterial sludges 2, and nitrite nitrogen and nitrate nitrogen are produced. As described hereinafter, in the method for treating ammoniacal nitrogen in wastewater of the present embodiment, bacterial sludges 2 held in the ammonium oxidizing tank 1 are once withdrawn to be treated in an inactivating operation and subsequently returned in the tank 1. This procedure enables production amounts of nitrite nitrogen and nitrate nitrogen produced in the nitrifying treatment step to be optionally controlled.

Bacterial sludges 2 containing a nitrifying bacterial population are used in the ammonium oxidizing tank 1. Such a nitrifying bacterial population contained in a bacterial sludge obtained via enrichment cultivation is generally a mixture of ammonium oxidizing bacteria (AOB) classified in Nitrosomonas, Nitrosococcus, Nitrosospira, Nitrosolobus or the like, and nitrite oxidizing bacteria (NOB) classified in Nitrobactor, Nitrospina, Nitrococcus, and Nitrospira or the like.

Figure 2:
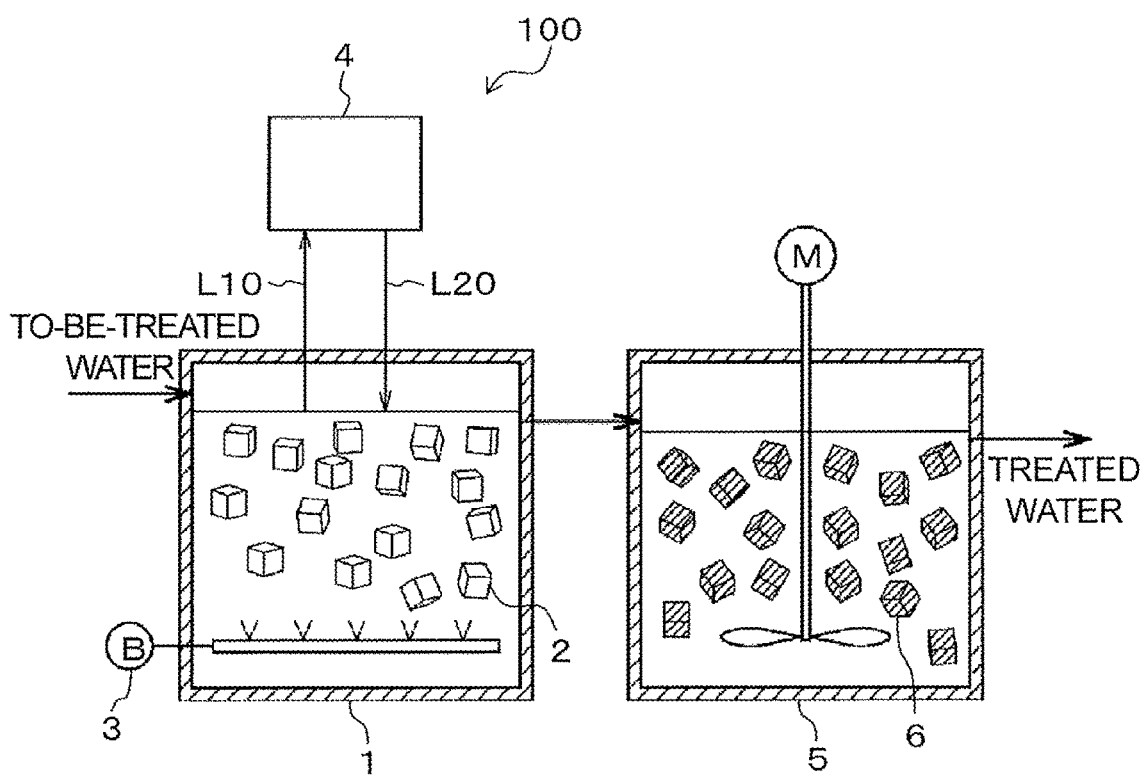
FIG. 2 is a schematic view showing an arrangement example of a wastewater treatment device in an embodiment of the present invention.

The bacterial sludge 2 is immobilized on a fluidal bed carrier in FIG. 2. Herein, the bacterial sludge may be used in the state of either inclusively-immobilized on a carrier, adhesively-immobilized on a carrier, forming granules via self-granulation, or a floating sludge which floats in the water. Further, the bacterial sludge thus immobilized may be used in any one of an immobilized bed, a fluidal bed or a movable bed.

A carrier may have any shape of a cubic, rectangular, spherical, cylindrical, porous, sponge, fibrous, or chrysanthemum blossom structure. As a material of the carrier, the followings may be used, including monomethacrylate, monoacrylate, dimethacrylate, trimethacrylate, triacrylate, tetraacrylate, urethane acrylate, epoxyacrylate, polyvinylalcohol, polyethyleneglycol, polypropyreneglycol, acrylamide. A size of a fluidal bed carrier is not limited to a specific one and may be, for example, 3 mm square.

The ammonium oxidizing tank 1 is provided with an air diffuser 3 configured to aerate to-be-treated water that is to be treated in a nitrifying treatment. The air diffuser 3 includes, for example, a diffuser and a diffusion pipe for generating bubbles, a fan for feeding air, a compressor for compressing air, and an air pipe for supplying air from a fan to a diffuser and diffusion pipe. An aeration flow rate for to-be-treated water may be controlled at a constant level by the air diffuser.

Alternatively, the aeration flow rate may be variably controlled depending on change in loads of ammoniacal nitrogen, targeted production amounts of nitrite nitrogen and nitrate nitrogen, and a removal rate of ammoniacal nitrogen. Herein, in the method for treating ammoniacal nitrogen in the present invention, as mentioned later, the aeration flow rate does not need to be accurately controlled in variable manner because production amounts of nitrite nitrogen and nitrate nitrogen are adjusted by the inactivating step.

The ammonium oxidizing tank 1 may be provided with a pH adjustment device which supplies alkali such as sodium hydrogen carbonate, sodium hydroxide to to-be-treated water. A pH value of the ammonium oxidizing tank 1 is typically set in the range from 6 to 9, preferably 7.5 to 8.2. A water temperature of the ammonium oxidizing tank 1 is typically set in the range from 10° C. to 40° C.

The inactivating treatment tank 4 is a treating tank configured to treat the bacterial sludges 2 with an inactivating treatment. The inactivating treatment is a process for inactivating the bacterial sludges 2 via sterilizing bacteria or causing bacteriostasis. A part of the bacterial sludges 2 used in the ammonium oxidizing tank 1 is transferred from the ammonium oxidizing tank 1 to the inactivating treatment tank 4, and subjected to the inactivating operation.

The inactivating treatment tank 4 may be, for example, a water tank configured to perform an inactivating operation to to-be-treated water thus transferred in combination with the bacterial sludges 2 from the ammonium oxidizing tank 1.

Alternatively, the inactivating treatment tank 4 may have, for example, a box shape configured to perform an inactivation operation to the bacterial sludges 2 thus withdrawn from to-be-treated water in the ammonium oxidizing tank 1 separately from the to-be-treated water.

The ammoniacal nitrogen treating device 100 is provided with a transfer passage L10 configured to transfer biological sludges 2 from the ammonium oxidizing tank 1 to the inactivating treatment tank 4, and a return passage L20 configured to return the bacterial sludge 2 from the inactivating treatment tank 4 to the ammonium oxidizing tank 1. Both passages L10 and L20 are arranged between the ammonium oxidizing tank 1 and the inactivating treatment tank 4.

The transfer passage L10 and the return passage L20 include, for example, a pipe and a hose or the like, and are configured to withdraw bacterial sludges 2 thus immobilized, bacterial sludges 2 which form granules via self-granulation and bacterial sludges 2 which float in the water all together with the to-be-treated water, and transfer those materials. A various types of pumps may be used as a transferring pump, including an airlift pump, a screw pump, a piston pump, a hose pump or the like. Further, the return passage 20 may transfer those materials using gravity in addition to a transferring pump.

Alternatively, the transfer passage L10 and the return passage L20 may be configured to be sieve-type containers such as a strainer and a colander so as to withdraw the bacterial sludges 2 from the to-be-treated water and transfer them, when the bacterial sludges 2 are in the state of being inclusively-immobilized on carriers, adhesively-immobilized to carriers, or forming granules via self-granulation. The sieve-type container is arranged so that the container automatically moves between the ammoniacal oxidizing tank 1 and the inactivating treatment tank 4.

Next, a method for treating ammoniacal nitrogen in wastewater of the present embodiment will be described more specifically.

The method for treating ammoniacal nitrogen in wastewater of the present embodiment relates to a method for treating water, by which ammoniacal nitrogen contained in wastewater is oxidized by bacterial sludges including a nitrifying bacterial population, thereby to produce nitrite nitrogen and nitrate nitrogen which become reactants of general denitrifying and anaerobic ammonium oxidation reactions.

Here, a nitrifying treatment for oxidizing ammoniacal nitrogen is carried out by repeatedly performing the steps of inactivating bacterial sludges thus withdrawn from the ammonium oxidizing tank (i.e., inactivating treatment) via sterilizing bacteria or causing bacteriostasis in the bacterial sludges (i.e., inactivating operation), and oxidizing ammoniacal nitrogen by the bacterial sludges thus treated in the inactivating operation (i.e., nitrifying treatment).

The inactivating operation is a process for sterilizing bacteria or inhibiting bacterial proliferation, and specifically means a process for lowering bioactivity of a nitrifying bacterial population contained in a bacterial sludge. Generally, in the nitrifying bacterial population when a temperature of water is low, when concentrations of ammonium nitrogen and/or nitrite nitrogen are low, when a dissolved oxygen concentration is high, or when a pH value is low, nitrite oxidizing bacteria have predominant bioactivity, and therefore, nitrite nitrogen thus produced by ammonium oxidizing bacteria is rapidly oxidized to nitrate nitrogen by nitrite oxidizing bacteria.

Hence, even though operators try to just control an aeration flow rate, a nitrogen load, a water temperature, a pH value and a retention time as generally carried out, nitrite nitrogen is ready consumed to easily generate nitrate nitrogen. Thus, it is difficult to control desired amounts of nitrite nitrogen and nitrate nitrogen to be produced.

In contrast, the method for treating ammoniacal nitrogen in wastewater of the present embodiment is carried out by performing the inactivating operation to the bacterial sludges 2 thus withdrawn from the ammonium oxidizing tank 1, and once lowering the bioactivity of ammonium oxidizing bacteria which oxidize ammoniacal nitrogen to nitrite nitrogen, and also the bioactivity of nitrite oxidizing bacteria which oxidize nitrite nitrogen to nitrate nitrogen.

Here, it should be noted that nitrite oxidizing bacteria have a higher proliferation rate than ammonium oxidizing bacteria. Therefore, after the inactivating operation is performed, nitrite oxidizing bacteria recover the bioactivity more quickly than ammonium oxidizing bacteria.

As mentioned above, the production amounts of nitrite nitrogen and nitrate nitrogen may be controlled in the desired values, by adjusting the biomass of the bacterial sludges 2 subjected to the inactivating operation, and the time interval between the inactivating operations, and thereby creating a condition in which reactivity of either the ammonium oxidizing reaction or the nitrite oxidizing reaction is relatively predominant. For example, after the bioactivity of ammonium oxidizing bacteria is lowered by the inactivating operation, if the conditions until the ammonium oxidizing bacteria recover the bioactivity are kept, a residual amount of ammoniacal nitrogen increases, while production amounts of nitrite nitrogen and nitrate nitrogen decrease.

Further, after the bioactivity of both ammonium oxidizing bacteria and nitrite oxidizing bacteria is lowered, if the conditions that the ammonium oxidizing bacteria recover the bioactivity while the nitrite oxidizing bacteria do not completely recover the bioactivity are kept, a residual amount of ammoniacal nitrogen decreases, a production amount of nitrite nitrogen increases, while a production amount of nitrate nitrogen decreases.

Moreover, after the bioactivity of both ammonium oxidizing bacteria and nitrite oxidizing bacteria is lowered, if the conditions until both the ammonium oxidizing bacteria and the nitrite oxidizing bacteria recover the bioactivity are kept, a residual amount of ammoniacal nitrogen decreases and a production amount of nitrite nitrogen decreases, while a production amount of nitrate nitrogen increases.

In other words, in the method for treating ammoniacal nitrogen in wastewater of the present embodiment, the reactivity of the ammonium oxidizing reaction is controlled so that the rate of at least a production amount of either nitrite nitrogen or nitrate nitrogen to the residual amount of ammoniacal nitrogen becomes a desired value, and further the reactivity of the nitrite oxidizing reaction is simultaneously controlled so as to substantially produce either nitrite nitrogen alone, nitrate nitrogen alone, or nitrite nitrogen and nitrate nitrogen together. The above procedure enables a production rate of ammoniacal nitrogen, nitrite nitrogen and nitrate nitrogen to be desirably controlled.

The inactivating operation thus treated to the bacterial sludges 2 includes, for example, a process for making the bacterial sludges contact with an acid, an alkali, an organic solvent, a bactericide, a hypertonic solution, an ammonia solution, or nitrous acid, and a process for repeatedly performing heat sterilization, radiation sterilization, gaseous sterilization, and physical sterilization to the bacterial sludges.

Here, such an acid includes, for example, hydrochloric acid, sulfuric acid, acetic acid, lactic acid, citric acid and their aqueous solutions. The alkali includes, for example, sodium hydroxide, potassium hydroxide, calcium hydroxide and their aqueous solutions.

The organic solvent includes, for example, alcohols such as ethanol and isopropanol, ethers such as diethyl ether, aldehydes such as formaldehyde, phenols, benzene derivatives such as benzene and toluene, esters such as ethyl acetate, hydrocarbons such as hexane, dimethyl sulfoxide, acetone, acetonitrile or the like.

The bactericide includes, for example, a solution containing a metal such as silver, copper and mercury, ozone, hydrogen peroxide, potassium permanganate, hypochlorite, chloramine, titanium oxide or the like. The hypertonic solution includes, for example, a hypertonic solution containing sodium chloride or the like. Further, the ammonia solution and the nitrous acid solution include a solution having a concentration higher than a 50% inhibitory concentration.

The inactivating operation in which the above solutions are made contact with the bacterial sludges is carried out by providing a feeding device which feeds a solution containing an acid, an alkali, an organic solvent, a bactericide, a hypertonic solution, an ammonia solution, or nitrous acid to the inactivating treatment tank 4, and adding the solution into the to-be-treated water thus transferred with the bacterial sludges from the ammonium oxidizing tank 1, or immersing the bacterial sludges 2 thus withdrawn from the to-be-treated water held in the ammonium oxidizing tank 1 into said solution.

The heat sterilization includes, for example, a process for heating the to-be-treated water transferred with the bacterial sludges 2 from the ammonium oxidizing tank 1, as well as the bacterial sludges 2 withdrawn from the to-be-treated water in the ammonium oxidizing tank 1. The inactivating operation performing the heat sterilization may be carried out by providing a heat exchange type or a jacket type humidifying device or a steam heating device with the inactivating treatment tank 4.

The radiation sterilization includes, for example, a process for irradiating UV beams, gamma beams, electron beams onto the to-be-treated water thus transferred with the bacterial sludges 2 from the ammonium oxidizing tank 1, as well as the bacterial sludges 2 thus withdrawn from the to-be-treated water in the ammonium oxidizing tank 1. The inactivating operation performing the radiation sterilization may be carried out by providing a UV-beam irradiation device, gamma-beam irradiation device, or an electron-beam irradiation device with the inactivating treatment tank 4.

The gaseous sterilization includes, for example, a process for making the bacterial sludges 2 thus withdrawn from the to-be-treated water in the ammonium oxidizing tank 1 contact with a gas of ethylene oxide, hydrogen peroxide, or formaldehyde and the like. The inactivating operation performing the gaseous sterilization may be carried out by providing a gas feeding device which feeds a gas of ethylene oxide, hydrogen peroxide, or formaldehyde and the like with the inactivating treatment tank 4.

The physical sterilization includes, for example, a process for applying outer force which just destroys bacterial cells onto the to-be-treated water thus transferred with the bacterial sludges 2 from the ammonium oxidizing tank 1, as well as the bacterial sludges 2 thus withdrawn from the to-be-treated water in the ammonium oxidizing tank 1. The inactivating operation performing the physical sterilization may be carried out by providing a steam heating device, a dry heating device, a pressurizing device which applies a high pressure, a decompression device, a jet generator which provides impact force to the wastewater, a stirrer, a bubble generator which generates microbubbles, a centrifugal separator, a drier, a sonicator, a high voltage generator which applies a high voltage to bacteria with the inactivating treatment tank 4.

However, the inactivating operation is not limited to the above examples, and appropriate processes may be used as long as such processes may sterilize a nitrifying bacterial population or cause the bacteriostasis. For example, processes for extremely changing a growth environment of a nitrifying bacterial population, performing sterilization filtration to a nitrifying bacterial population, or exposing a nitrifying bacterial population to chemical agents or a variety of inhibitors may be used for the inactivating operation via adjusting their conditions. Further, the inactivating operation may be performed by using one of those processes alone or combining a plurality of the processes.

Here, the inactivating operation may be performed so that a nitrifying bacterial population is not completely sterilized but sufficiently causes the bacteriostasis. Here, intensities of the effect for lowering the bioactivity of a nitrifying bacterial population vary depending on the types and conditions of the inactivating operation, the biomass, and the environment subjected to the inactivating treatment. Therefore, it is preferable to carry out a preliminary test in advance, and estimate the intensity of the effect for lowering the bioactivity of the nitrifying bacterial population in advance.

Accordingly, desired amounts of nitrifying nitrogen and nitrate nitrogen may be produced by intermittently repeating the inactivating operation having the constant intensity of the effect for lowering the bioactivity of the nitrifying bacterial population under the conditions the same as in the preliminary test, while the to-be-treated water is subjected to the nitrifying treatment.

For example, in the inactivating operation, when the bacterial sludges 2 are subjected to heat sterilization, preferably the heating temperature is set in the range from 30° C. to 90° C., more preferably from 40° C. to 70° C. When the bacterial sludges 2 are inclusively-immobilized on carriers, the heating temperature is preferably set in the range from 50° C. to 70° C., more preferably about 60° C. Further, a heating time is preferably set at least for 1 hr, and at most for 2 hr from the viewpoint of reducing wasteful energy.

Under the above conditions, the nitrifying bacterial population sufficiently turns into the bacteriostatic state, thereby providing a large time difference until nitrite oxidizing bacteria and ammonium oxidizing bacteria recover the bioactivity. This allows the reactivity intensities of the ammonium oxidizing reaction and the nitrite oxidizing reaction to be easily controlled.

The production amounts of nitrite nitrogen and nitrate nitrogen may be controlled by adjusting the biomass of the bacterial sludges 2 to be treated in the inactivating operation. The inactivating operation may be carried out by withdrawing a part of the bacterial sludges 2 from the ammonium oxidizing tank 1, or withdrawing all of the bacterial sludges 2 therefrom.

For example, when the biomass of the bacterial sludges 2 to be treated in the inactivating operation is increased, the ammonium oxidizing bacteria may have higher bioactivity than the nitrite oxidizing bacteria. In contrast, when the biomass of the bacterial sludges 2 to be treated in the inactivating operation is decreased, the nitrite oxidizing bacteria may have higher bioactivity than the ammonium oxidizing bacteria.

From the viewpoint of increasing a nitrogen removal rate, the biomass of the bacterial sludges 2 to be treated in the inactivating operation is preferably set in several tens percentages (%) or less to the total biomass, more preferably several percentages (%) to the total biomass. This is because the larger biomass of the bacterial sludges 2 to be withdrawn from the ammonium oxidizing tank 1 prevents the oxidation of ammoniacal nitrogen from proceeding. Here, each biomass of the bacterial sludges 2 to be treated per inactivating operation may be the same or different among the respective inactivating operations.

Further, the production amounts of nitrite nitrogen and nitrate nitrogen may be controlled by adjusting a time interval between the inactivating operations each of which is repeatedly carried out in combination with the step of oxidizing ammoniacal nitrogen (i.e., nitrifying treatment). That is, the production amounts may be controlled by adjusting a time interval between the steps of repeatedly treating the inactivating operation to the bacterial sludges 2 (i.e., inactivating treatment).

For example, the ammonium oxidizing bacteria may have higher bioactivity than the nitrite oxidizing bacteria via decreasing the time interval between the inactivating operations and increasing the frequency of the inactivating operations. On the contrary, the nitrite oxidizing bacteria may have higher bioactivity than the ammonium oxidizing bacteria via increasing the time interval between the inactivating operations and decreasing the frequency of the inactivating operations.

Here, the time interval between the inactivating operations is not limited to specific times. However, from the viewpoints of reducing cost for transferring the bacterial sludges 2, and securing a proliferation time till the recovery of the bacterial activity, the time interval is preferably set in once to three times per day, more preferably once per several days. Here, the production amounts of nitrite nitrogen and nitrate nitrogen may be controlled by adjusting both the biomass of the bacterial sludges 2 to be treated in the inactivating operations and the time interval between the inactivating operations.

Further, the production amounts of nitrite nitrogen and nitrate nitrogen may be controlled by adjusting the start timing when the step of treating the inactivating operation to the bacterial sludges 2 (i.e., inactivating treatment) is initiated after the to-be-treated water containing ammoniacal nitrogen is subjected to the nitrifying treatment. If the start timing of the inactivating treatment is delayed, the ammonium oxidizing reaction and the nitrite oxidizing reaction proceed before the bioactivity of the nitrifying bacterial population is suppressed. This results in a decrease in the residual amount of ammoniacal nitrogen as well as an increase in the production amounts of nitrite nitrogen and nitrate nitrogen.

On the contrary, if the start timing of the inactivating treatment is advanced, the ammonium oxidizing reaction does not proceed before the bioactivity of the nitrifying bacterial population is suppressed. This results in an increase in the residual amount of ammoniacal nitrogen as well as a decrease in the production amounts of nitrite nitrogen and nitrate nitrogen.

In the method for treating ammoniacal nitrogen in wastewater as described hereinbefore, the reactivity intensities of the ammonium oxidizing reaction and the nitrite oxidizing reaction may be controlled by adjusting the biomass of the bacterial sludges to be treated in the inactivating operations and the time interval between the inactivating operations each repeatedly carried out in combination with the step of oxidizing ammoniacal nitrogen. This control in the reactivity intensities enables ammoniacal nitrogen to be biologically oxidized to produce nitrite nitrogen and nitrate nitrogen at a desired rate.

The biomass of the bacterial sludges and the time interval between the inactivating operations are indexes by which reproducible control in the ammonium oxidizing activity and the nitrite oxidizing activity may be realized via performing a preliminary test in advance. Accordingly, the responsiveness and accuracy of the control may be highly improved compared to the conventional procedure performed through, for example, adjustments of only the aeration flow rate.

FIG. 2 is a schematic view showing an arrangement example of a wastewater treatment device in an embodiment of the present invention.

As shown in FIG. 2, an ammoniacal nitrogen treating device 100 may be provided so that an ammonium oxidizing tank 1 is arranged at an upstream side of an anaerobic ammonium oxidation reaction tank in which ammoniacal nitrogen and nitrite nitrogen are co-denitrified by anaerobic ammonium oxidizing bacteria. Wastewater containing nitrogenous component (i.e., to-be-treated water) is introduced into the ammoniacal nitrogen treating device 100 shown in FIG. 2. Herein, nitrite-type nitrification is carried out in the ammonium oxidizing tank 1. Anaerobic ammonium oxidation is carried out in the anaerobic ammonium oxidation reaction tank 5.

The anaerobic ammonium oxidation reaction tank 5 is a treating tank configured to co-denitrify by anaerobic ammonium oxidizing bacteria ammoniacal nitrogen and nitrite nitrogen contained in the to-be-treated water thus subjected to the nitrite-type nitrification. In the anaerobic ammonium oxidation reaction tank 5, ammoniacal nitrogen and nitrite nitrogen contained in the to-be-treated water are converted to nitrogen gas and nitrate nitrogen under the anaerobic conditions.

In FIG. 2, anaerobic ammonium oxidizing bacteria 6 are immobilized on fluid bed carriers. Herein, the anaerobic ammonium oxidizing bacteria 6 may be used in the state of either inclusively-immobilized on the carriers, adhesively-immobilized on the carries, forming granules via self-granulation, or floating sludges which float in the water. Further, the anaerobic ammonium oxidizing bacteria 6 thus immobilized may be used in the form of either a fixed bed, a fluidal bed, or a movable bed. A fluidal bed carrier may have the same shape, material, size as in the ammonium oxidizing tank 1.

The anaerobic ammonium oxidation reaction tank 5 may be provided with a stirrer which stirs wastewater therein, a Ph adjustment device which feeds acids like sulfuric acid or hydrochloric acid to the to-be-treated water. A water temperature of the anaerobic ammonium oxidation reaction tank 5 is preferably set in the range from 20° C. to 40° C., more preferably kept in the 30° C. to 37° C. A pH value of the anaerobic ammonium oxidation reaction tank 5 is adjusted preferably in the range from 6.5 to 9.0, more preferably from 7.0 to 8.2.

The ammoniacal nitrogen treating device 100 shown in FIG. 2 is configured to treat nitrogenous components so that a rate between the residual amount of ammoniacal nitrogen remained in the ammonium oxidizing tank 1 and the production amount of nitrite nitrogen is adjusted to be about 1:1.3.

A start timing of the step of treating the inactivating operation (i.e., inactivating treatment) to the bacterial sludges 2 after initiation of the method for treating the to-be-treated water containing ammoniacal nitrogen should be set in the early period before the ammonium oxidizing reaction sufficiently proceeds and the production amounts of nitrite nitrogen and nitrate nitrogen become larger than the residual amount of ammoniacal nitrogen.

After that, the ammoniacal nitrogen treating device 100 increases a production amount of nitrite nitrogen and decreases a production amount of nitrate nitrogen by increasing the biomass of the bacterial sludges 2 to be treated in the inactivating operations, and/or decreasing the time interval between the inactivating operations each repeatedly carried out in combination with the step of oxidizing ammoniacal nitrogen (i.e., nitrifying treatment). This procedure allows ammoniacal nitrogen to be appropriately subjected to the partial nitrite-oxidation.

As mentioned hereinbefore, the embodiments of the present invention have been described in detail. However, the present invention is not limited to those embodiments, and a variety of modifications may be available without departing from the scope of the present invention. For example, the present invention is not necessarily limited to embodiments having all the components included in the above embodiments. More specifically, a part of the components of the embodiments may be replaced by other components. Some of the components may be added to the embodiments, and a part of the components of the embodiments may be omitted.

For example, the ammonium oxidizing tank 1 is described as a one-pass tank which is configured to perform the nitrite-type nitrification to all amounts of the to-be-treated water. However, the ammonium oxidizing tank 1 may be a by-pass tank. That is, a part of the to-be-treated water may be introduced into the ammonium oxidizing tank 1 to oxidize all the amounts of ammoniacal nitrogen to produce nitrite nitrogen, while the remaining part of the to-be-treated water is diverted so as not to be subjected to nitrite-type nitrification, and joins the anaerobic ammonium oxidation reaction tank 5.

Alternatively, the ammoniacal nitrogen treating device 100 is used as a single tank in the anaerobic ammonium oxidation method, and nitrite-type nitrification and anaerobic ammonium oxidation may be carried out in the ammonium oxidizing tank 1 as a single tank.

Further, the ammoniacal nitrogen treating device 100 may be provided so that the ammonium oxidizing tank 1 is arranged at a downstream side of: an adjustment tank configured to adjust water quality and water flow rate of wastewater containing nitrogenous components, a bioreaction tank configured to biologically decompose organic substances contained in wastewater, or a pre-denitrifying tank configured to denitrify nitrate nitrogen contained in wastewater in advance.

Such a bioreaction tank includes a treating tank configured to decompose wastes by, for example, an activated sludge method, a sprinkling filter method, an aerobic filter method, a rotating biological contact method, a membrane separation bioreactor method, an anaerobic filter method, and an anaerobic granule sludge method or the like.

Further, the ammoniacal nitrogen treating device 100 may be provided so that the ammonium oxidizing tank 1 instead of the anaerobic ammonium oxidation reaction tank 5 is arranged at an upstream side of: an adjustment tank configured to adjust water quality and water flow rate of treated water thus treated in the ammonium oxidizing tank 1, a mixing tank configured to join to-be-treated water thus diverted from the ammonium oxidizing tank 1, or a post-denitrifying tank configured to denitrify nitrate nitrogen remained in the treated water thus treated in the ammonium oxidizing tank 1.

Further, the ammoniacal nitrogen treating device 100 may be provided with a transfer passage L10 for transferring the bacterial sludges 2 from the ammonium oxidizing tank 1 to the inactivating treatment tank 4, and the return passage L20 for returning the bacterial sludges 2 from the inactivating treatment tank 4 to the ammonium oxidizing tank 1. However, the ammoniacal nitrogen treating device 100 may be provided with no return passage L20, but the bacterial sludges 2 may be manually transferred instead.

EXAMPLE

Next, the present invention will be described in detail referring to Examples of the present invention. However, the present invention is not limited to those Examples.

Example 1

First, prepared were inclusively-immobilized carriers thus immobilized to bacterial sludges formed of a mixture of ammonium oxidizing bacteria (AOB) and nitrite oxidizing bacteria (NOB). The inclusively-immobilized carriers were added into a reactor (1 L volume) so that the biomass of the bacterial sludges was 0.1 L, and the reactor was placed in an incubator kept at 20° C. Then, raw water having an ammoniacal nitrogen concentration of about 45 mg-N/L was introduced into the reactor so that the hydraulic retention time was set for 3 hr. The inside of the reactor was aerated by a blower to keep the dissolved oxygen concentration at 6 mg/L or more. Under those conditions, the raw water was subjected to the nitrifying treatment.

Next, while the nitrifying treatment was continued, a part of the inclusively-immobilized carriers (i.e., 1%, 5%, 20%, 50%) was withdrawn from the reactor at the time intervals of about 24 hr. The bacterial sludges thus immobilized on the withdrawn carriers having 1%, 5%, 20%, 50% of the initial biomass were respectively treated in the inactivating operations. The inactivating operations were carried out by heating treatment (i.e., heat sterilization). Specifically, the immobilized carriers thus withdrawn from the reactor were immersed in water kept at 60° C., thereby making a part of the bacteria subjected to the sterilization or bacteriostasis as described in Japanese Patent Publication No. 3788601.

Table 1 shows concentrations of ammoniacal nitrogen, nitrite nitrogen and nitrate nitrogen when the nitrifying treatment was completed and the concentration of each nitrogen component reached a constant level.

TABLE 1

| | Inactivating Operation | | Nitrogenous Component Concentration | | |
|---|---|---|---|---|---|
| | Method | Biomass (%) | NH4-N (mg/L) | NO2-N (mg/L) | NO3-N (mg/L) |
| 1 | Heating (60° C.) | 1 | 6 | 8 | 31 |
| 2 | Heating (60° C.) | 5 | 20 | 17 | 9 |
| 3 | Heating (60° C.) | 20 | 27 | 15 | 4 |
| 4 | Heating (60° C.) | 50 | 40 | 3 | 1 |

Example 2

First, prepared were inclusively-immobilized carriers thus immobilized on bacterial sludges formed of a mixture of ammonium oxidizing bacteria (AOB) and nitrite oxidizing bacteria (NOB). The inclusively-immobilized carriers were added into a reactor (1 L volume) so that the biomass of the bacterial sludges was 0.1 L, and the reactor was placed in an incubator kept at 20° C. Then, raw water having an ammoniacal nitrogen concentration of about 40 mg-N/L was introduced into the reactor so that the hydraulic retention time was set for 3 hr. The inside of the reactor was aerated by a blower to keep the dissolved oxygen concentration at 6 mg/L or more. Under those conditions, the raw water was subjected to the nitrifying treatment.

Next, during the nitrifying treatment, a part of the inclusively-immobilized carriers (i.e., 1%, 5%, 20%, 50%) was withdrawn from the reactor at about 24 hr time intervals. The bacterial sludges thus immobilized on the withdrawn carriers having 1%, 5%, 20%, 50% of the initial biomass respectively were subjected to the inactivating operation. The inactivating operation was carried out by making the immobilized carriers thus withdrawn from the reactor contact with an alkali. Specifically, the inclusively-immobilized carriers thus withdrawn from the reactor were immersed in an aqueous sodium hydroxide solution adjusted at pH13 for 1 hr, thereby making a part of the bacteria subjected to the sterilization or bacteriostasis.

Table 2 shows concentrations of ammoniacal nitrogen, nitrite nitrogen and nitrate nitrogen when the nitrifying treatment was completed and the concentration of each nitrogen component reached a constant level.

TABLE 2

| | Inactivating Operation | | Nitrogenous Component Concentration | | |
|---|---|---|---|---|---|
| | Method | Biomass (%) | NH4-N (mg/L) | NO2-N (mg/L) | NO3-N (mg/L) |
| 4 | Alkali (pH13) | 1 | 4 | 7 | 29 |
| 5 | Alkali (pH13) | 5 | 7 | 15 | 8 |
| 6 | Alkali (pH13) | 10 | 26 | 15 | 5 |
| 7 | Alkali (pH13) | 50 | 41 | 3 | 2 |

As shown by the differences in the results of Examples 1 and 2, even though the biomass of the bacterial sludges to be subjected to the inactivating operation is the same as in each Example, if there is a difference in the methods of the inactivating operation, the concentrations of the remained ammoniacal nitrogen and the concentrations of the nitrite nitrogen and nitrate nitrogen thus produced are different between Examples 1 and 2.

Accordingly, when there is a difference in the intensities of losing the bioactivity by the inactivity operation, or when the time interval between the inactivating operations is modified, it is necessary to check an effect of the sterilization and bacteriostasis on the bacteria in advance. If such an effect is checked in advance, nitrite nitrogen and nitrate nitrogen may be accurately produced at a desired rate.

Example 3

First, prepared were inclusively-immobilized carriers thus immobilized on bacterial sludges formed of a mixture of ammonium oxidizing bacteria (AOB) and nitrite oxidizing bacteria (NOB). The inclusively-immobilized carriers were added into a reactor (1 L volume) so that the biomass of the bacterial sludges was 0.1 L, and the reactor was placed in an incubator kept at 20° C. Then, raw water having an ammoniacal nitrogen concentration of about 45 mg-N/L was introduced into the reactor so that the hydraulic retention time was set for 3 hr. The inside of the reactor was aerated by a blower to keep the dissolved oxygen concentration at 6 mg/L or more. Under those conditions, the raw water was subjected to the nitrifying treatment.

Next, during the nitrifying treatment, 5% of the inclusively-immobilized carriers were withdrawn from the reactor at the time interval of about 48 hr. The bacterial sludges thus immobilized on the withdrawn carries having 5% of the initial biomass were subjected to the inactivating operation. The inactivating operation was carried out by heat treatment (i.e., heat sterilization). Specifically, the inclusively-immobilized carriers thus withdrawn from the reactor were immersed in water kept at 60° C. and a part of the bacteria was subjected to the sterilization or bacteriostasis, as described in Japanese Patent Publication No. 3788601.

When the nitrifying treatment was completed and the concentration of each nitrogenous component reached a constant level, the concentration of ammoniacal nitrogen ($NH_4$—N) was about 12 mg/L, the concentration of nitrite nitrogen ($NO_2$—N) was about 14 mg/L, and the concentration of nitrate nitrogen ($NO_3$—N) was about 19 mg/L, respectively. As shown by the differences of the results in Example 3 from those in Example 1 ($NH_4$—N concentration=about 20 mg/L; $NO_2$—N concentration=about 17 mg/L; $NO_3$—N concentration=about 9 mg/L), even though the method of the inactivating operation is the same, if there is a difference in the time interval between the inactivating operations, the concentration of the remained ammoniacal nitrogen and the concentrations of the produced nitrite nitrogen and nitrate nitrogen become different.

Accordingly, the concentrations of the produced nitrite nitrogen and nitrate nitrogen may be controlled by adjusting the time interval between the inactivating operations (i.e., inactivating treatment) repeatedly performed.

Example 4

First, prepared were inclusively-immobilized carriers thus immobilized to bacterial sludges formed of a mixture of ammonium oxidizing bacteria (AOB) and nitrite oxidizing bacteria (NOB). The inclusively-immobilized carriers were added to a reactor (1 L volume) so that the biomass of the bacterial sludges was 0.1 L, and the reactor was placed in an incubator kept at 20° C. Then, raw water having an ammoniacal nitrogen concentration of about 40 mg-N/L was introduced into the reactor so that the hydraulic retention time was set for 3 hr. The inside of the reactor was aerated by a blower to keep the dissolved oxygen concentration at 6 mg/L or more. Under those conditions, the raw water was subjected to the nitrifying treatment.

Then, as the ammonium oxidation proceeded, the concentration of ammoniacal nitrogen ($NH_4$—N) reached 8 mg/L, the concentration of nitrite nitrogen ($NO_2$—N) reached 28 mg/L, and the concentration of nitrate nitrogen ($NO_3$—N) reached 4 mg/L. After that, a part of the inclusively-immobilized carriers (4%) was withdrawn from the reactor at the time interval of about 24 hr while the nitrifying treatment was continued, and the bacterial sludges having 4% of the initial biomass were subjected to the inactivating operations. The inactivating operation was carried out by heat treatment (i.e., heat sterilization). Specifically, the inclusively-immobilized carriers thus withdrawn from the reactor were immersed in water kept at 60° C. and a part of the bacteria was subjected to the sterilization or bacteriostasis, as described in Japanese Patent Publication No. 3788601.

After the above nitrifying treatment was carried out for 20 days, the concentration of ammoniacal nitrogen ($NH_4$—N) was about 13 mg/L, the concentration of nitrite nitrogen ($NO_2$—N) was about 14 mg/L, and the concentration of nitrate nitrogen ($NO_3$—N) was about 13 mg/L.

Example 5

First, prepared were inclusively-immobilized carriers thus immobilized to bacterial sludges formed of a mixture of ammonium oxidizing bacteria (AOB) and nitrite oxidizing bacteria (NOB). The inclusively-immobilized carriers were added to a reactor (1 L volume) so that the biomass of the bacterial sludges was 0.1 L, and the reactor was placed in an incubator kept at 20° C. Then, raw water having an ammoniacal nitrogen concentration of about 40 mg-N/L was introduced into the reactor so that the hydraulic retention time was set for 3 hr. The inside of the reactor was aerated by a blower to keep the dissolved oxygen concentration at 6 mg/L or more. Under those conditions, the raw water was subjected to the nitrifying treatment.

Hence, after ammonia was oxidized, the nitrite oxidation further proceeded. Then, the concentration of ammoniacal nitrogen ($NH_4$—N) reached 12 mg/L, the concentration of nitrite nitrogen ($NO_2$—N) reached 7 mg/L, and the concentration of nitrate nitrogen ($NO_3$—N) reached 21 mg/L. After that, while the nitrifying treatment was continued, a part of the inclusively-immobilized carriers (4%) was withdrawn from the reactor at the time interval of about 24 hr, and the bacterial sludges having 4% of the initial biomass were subjected to the inactivating operations. The inactivating operation was carried out by heat treatment (i.e., heat sterilization). Specifically, the inclusively-immobilized carriers thus withdrawn from the reactor were immersed in water kept at 60° C. and a part of the bacteria was subjected to the sterilization or bacteriostasis, as described in Japanese Patent Publication No. 3788601.

After the above nitrifying treatment was carried out for 20 days, the concentration of ammoniacal nitrogen ($NH_4$—N) was about 8 mg/L, the concentration of nitrite nitrogen ($NO_2$—N) was about 6 mg/L, and the concentration of nitrate nitrogen ($NO_3$—N) was about 26 mg/L.

As shown by the differences in the results of Examples 4 and 5, if there is a difference in the start timings of the inactivating operation, the concentrations of the remained ammoniacal nitrogen and the concentrations of the produced nitrite nitrogen and nitrate nitrogen become different between Examples 4 and 5, and especially the concentrations of nitrate nitrogen are greatly influenced.

Accordingly, it is preferable to control the start timing of the inactivating operation in addition to the biomass of the bacterial sludges to be treated in the inactivating operation and the time interval between the inactivating operations.

DESCRIPTION OF REFERENCE NUMBERS

100 Ammoniacal Nitrogen Treating Device
1 Ammonium Oxidizing Tank
4 Inactivating Treatment Tank
5 Anaerobic Ammonium Oxidation Reaction Tank
6 Anaerobic Ammonium Oxidizing Bacteria

What is claimed is:

1. A method for treating ammoniacal nitrogen in wastewater performed via oxidizing the ammoniacal nitrogen by bacterial sludges included in the wastewater in a wastewater treatment tank, and producing at least either of nitrite nitrogen and nitrate nitrogen, the method comprising:
plural inactivating treatment steps, with each inactivating treatment step including temporarily removing a part of the bacterial sludges from the wastewater treatment tank, and treating the part of the bacterial sludges with an inactivating operation via sterilizing bacteria or causing bacteriostasis before returning the part of the bacterial sludges to the wastewater treatment tank;
a nitrifying treatment step of oxidizing the ammoniacal nitrogen by the bacterial sludges thus treated in the inactivating operation, wherein
production amounts of the at least either of nitrite nitrogen and the nitrate nitrogen are controlled by adjusting biomass of the part of the bacterial sludges treated and returned in the inactivating treatment steps.

2. The method for treating ammoniacal nitrogen in wastewater according to claim 1, wherein the bacterial sludges are a mixture of ammonium oxidizing bacteria which oxidize ammoniacal nitrogen to nitrite nitrogen and nitrite oxidizing bacteria which oxidize nitrite nitrogen to nitrate nitrogen.

3. The method for treating ammoniacal nitrogen in wastewater according to claim 1, wherein the inactivating operation is carried out by making part of the biological sludges contact with an acid, an alkali, an organic solvent, a bactericide, a hypertonic solution, an ammonia solution or a nitrous acid solution, or alternatively performing a physical sterilization treatment to the biological sludges.

4. The method for treating ammoniacal nitrogen in wastewater according to claim 1, wherein the bacterial sludge is in the state of either immobilized to a carrier, adhered to a carrier, or forming granules via self-granulation.

5. A method for treating ammoniacal nitrogen in wastewater performed via oxidizing the ammoniacal nitrogen by bacterial sludges included in the wastewater in a wastewater treatment tank, and producing at least either of nitrite nitrogen and nitrate nitrogen,
the method comprising:
plural inactivating treatment steps, with each inactivating including temporarily removing a part of the bacterial sludges from the wastewater treatment tank, and treating the part of the bacterial sludges with an inactivating operation via sterilizing bacteria or causing bacteriostasis before returning the part of the bacterial sludges to the wastewater treatment tank; and
a nitrifying treatment step of oxidizing the ammoniacal nitrogen by the bacterial sludges thus treated in the inactivating operation, wherein
production amounts of the at least either of nitrite nitrogen and the nitrate nitrogen are controlled by adjusting a time interval between the inactivating treatment steps which are carried out in combination with the nitrifying treatment step.

6. A method for treating ammoniacal nitrogen in wastewater performed via oxidizing the ammoniacal nitrogen by bacterial sludges included in the wastewater in a wastewater treatment tank, and producing at least either of nitrite nitrogen and nitrate nitrogen,
the method comprising:
plural inactivating treatment steps, with each inactivating treatment step including temporarily removing a part of the bacterial sludges from the wastewater treatment tank, and treating the part of the bacterial sludges with an inactivating operation via sterilizing bacteria or causing bacteriostasis before returning the part of the bacterial sludges to the wastewater treatment tank; and
a nitrifying treatment step of oxidizing the ammoniacal nitrogen by the bacterial sludges thus treated in the inactivating operation, wherein
production amounts of the at least either of nitrite nitrogen and the nitrate nitrogen are controlled by adjusting biomass of the part of the bacterial sludges treated and returned in the inactivating treatment steps, and a time interval between the inactivating treatment steps which are carried out in combination with the nitrifying treatment step.

\* \* \* \* \*